United States Patent [19]

Gee

[11] Patent Number: 5,064,694

[45] Date of Patent: Nov. 12, 1991

[54] USE OF SILICONE EMULSIONS IN THE WEB PRINTING PROCESS

[75] Inventor: Ronald P. Gee, Midland, Mich.

[73] Assignee: Dow Corning Corporation, Midland, Mich.

[21] Appl. No.: 531,815

[22] Filed: Jun. 1, 1990

[51] Int. Cl.[5] .......................... B05D 3/02; C09K 3/16

[52] U.S. Cl. .................................... 427/387; 427/391; 524/837; 524/588; 252/312; 106/287.12

[58] Field of Search ...................... 106/287.12, 287.13, 106/287.14, 287.15; 427/391, 361, 393.4, 387; 252/312; 524/837, 588

[56] References Cited

U.S. PATENT DOCUMENTS

| | | | |
|---|---|---|---|
| 4,046,930 | 9/1977 | Johnson et al. | 427/393.4 |
| 4,415,626 | 11/1983 | Hasenauer et al. | 428/327 |
| 4,551,385 | 11/1985 | Robbart | 428/323 |
| 4,637,341 | 1/1987 | Switall | 118/694 |
| 4,784,665 | 11/1988 | Ona et al. | 106/287.14 |
| 4,886,708 | 12/1989 | Marchal | 427/393.4 |

*Primary Examiner*—Shrive Beck
*Assistant Examiner*—Cary A. Veith
*Attorney, Agent, or Firm*—Sharon K. Severance

[57] ABSTRACT

This invention pertains to the use of silicone fine and micro emulsions in the web printing process. The use of the fine and micro emulsions provide improved antistatic and antimarring properties to the paper. They also have improved wetting onto the applicator roll and are dilution stable.

6 Claims, No Drawings

USE OF SILICONE EMULSIONS IN THE WEB PRINTING PROCESS

This invention pertains to the use of silicone fine emulsions and silicone microemulsions which have a particle size of 200 nanometers or less and contain both a cationic and a nonionic surfactant as process aids in web printing processes. The use of these silicone fine and micro emulsions provides improved antimarring, efficiency, static reduction, wetting, and dilution stability. The preferred silicone fine and micro emulsions are those prepared by emulsion polymerization.

BACKGROUND OF THE INVENTION

In the web printing process, the ink is applied to the paper and typically passed through an oven to cure. However, the ink printed on the paper web is often not sufficiently cured after it exits a drying oven. Because of the incomplete cure, the printed ink can be marred, or smeared, by abrasion against the rollers, former board, cutters and folders. Further, the paper can often obtain a static charge buildup during the printing which in turn can often cause problems such as paper jams or poor stacking on the pallet at the end of the line.

It is known in the art to apply silicone standard emulsions (emulsions having a particle size of greater than 300 nanometers) to the paper web immediately after the cure to act as an antimarring agent. Commercial fabric softeners are often added to the silicone standard emulsion bath to act as antistatic agents. The emulsion is applied to the printed paper by contacting the paper with a roller which is continuously coated with the emulsion. The ability of the emulsion to spread evenly over the surface of the roller from which it is applied is known as wettability or wetting. Silicone standard emulsions often lack good wetting onto the applicator roll which results in spotty and incomplete application of the emulsion onto the paper.

Further, the standard emulsions are not stable when diluted to low levels and/or they may lose their effectiveness when diluted to low levels. Typically, the printers purchase the standard emulsions in a "concentrated" form and dilute the standard emulsion to the desired concentration prior to use. However, the web printers may end up using the standard emulsion in higher concentrations than actually necessary due to instability at lower concentrations. This leads to waste of the standard emulsion and increased production costs.

There has been a long felt need in the web printing industry for improved silicone emulsions with higher efficiency in antimarring and a higher antistatic agent content. It is also preferred that the antistatic agent be contained in the emulsion to eliminate the need for adding costly commercial fabric softeners. However, with the silicone standard emulsions, increasing the cationic surfactant to improve the antistatic properties decreases the wettability and can also decrease dilution stability. Adding a nonionic surfactant or using higher amounts of nonionic surfactant can correct for the decrease in wettability but will cause particle flocculation which degrades the emulsion stability. Further, with silicone standard emulsions known in the art, there are limits on the amount of surfactants that can be added without degrading the emulsion. Often these limits are insufficient and do not result in an increase in the performance of the emulsion in reducing the marring and static problems.

U.S. Pat. No. 4,637,341 to Switall teaches the use of silicone emulsions in web paper printing. The invention described in U.S. Pat. No. 4,637,341 mostly pertains to an apparatus for applying an aqueous silicone emulsion to the paper web as it is moving through the printing press. The apparatus taught by Switall provides an on-line means of diluting the concentrated silicone emulsions for use in the web printing process. Switall does not provide any details on the type of silicone emulsions useful or improvement made to antimarring or antistatic properties from the process taught therein.

U.S. Pat. No. 4,551,385 to Robbart teaches the use of reactive siloxanes which are chemically bonded to cellulosic materials to improve printing characteristics. The reactive siloxanes are applied to the cellulosic material and cured prior to the printing with ink.

SUMMARY OF THE INVENTION

This invention pertains to the use of silicone fine and micro emulsions in the web printing process. Silicone fine and micro emulsions have the ability to store greatly increased amounts of both cationic (antistatic agents) and nonionic (wetting agents) surfactants without detrimentally effecting the stability of the fine and micro emulsions. Additionally, the fine and micro emulsions have excellent dilution stability due to their very small particle size and may be diluted to significantly lower concentrations than standard emulsions. Because of the improvements provided by using silicone fine and micro emulsions, printing presses can be operated at higher speeds without a risk of increasing static charge, marring, or reducing wettability.

It is an object of this invention to show the use of silicone fine and micro emulsions with a particle size of less than 200 nanometers as improved process aids in web printing processes.

It is further an object of this invention to show improvement in antistatic and wetting properties in the web printing process resulting from the use of the silicone fine and micro emulsions.

It is further an object of this invention to show the stability and effectiveness of the fine and microemulsions at very low concentrations.

THE INVENTION

This invention pertains to the use of silicone fine and micro emulsions to improve antimarring and antistatic properties while providing good wettability and dilution stability in the web paper printing process. The improvements made in the antimarring and antistatic properties are produced by the ability of the fine and micro emulsions to contain higher amounts of cationic and nonionic surfactants than what are normally found in standard emulsions.

Silicone fine and micro emulsions useful in the instant invention may be produced by any method known in the art. For example, U.S. Pat. No. 4,620,878 to Gee teaches a mechanical emulsion process that is useful for producing microemulsions. U.S. Pat. No. 2,891,920 to Hyde et al. teaches an emulsion polymerization process useful for producing fine emulsions. U.S. patent application Ser. No. 07/439,751 filed Nov. 21, 1989, by Tanaka et al., commonly owned, teaches an emulsion polymerization process useful for producing microemulsions and U.S. patent application Ser. No. 07/532,471, entitled "Method for Making Polysiloxane Emulsions" by Gee, commonly owned, filed concurrently, teaches an emulsion polymerization method useful for producing both fine and micro emulsions. U.S. Pat. No. 4,620,878 to Gee, U.S. Pat. No. 2,891,920 to Hyde et al., U.S. patent application Ser. No. 07/439,751 filed Nov. 21, 1989, by Tanaka et al., and U.S. patent application entitled "Method for Making Polysiloxane Emulsions" by Gee, commonly owned, filed concurrently, are herein incorporated by reference. Other methods not incorporated herein, however known in the art, may also be used for producing fine and micro emulsions which are useful as process aids in web printing.

The silicone fine and micro emulsions useful in the instant invention should have a particle size of less than 200 nanometers (nm). Microemulsions which have a particle size of less than 140 nm and more preferably which have a particle size of less than 80 nm have been found to be most useful in the instant invention.

The preferred silicone fine and micro emulsions are those prepared using emulsion polymerization processes. Further preferred are those fine and micro emulsions prepared using emulsion polymerization which employ dimethyl cyclicsiloxanes as the starting material. However, silicone fine and micro emulsions prepared using emulsion polymerization which contain copolymers or employ other cyclicsiloxanes as the starting material are also useful in the instant invention.

The fine and micro emulsions are typically produced and supplied to the printer at silicone polymer levels of 10% by weight or higher. The printer further dilutes the emulsion such that it contains a silicone polymer concentration of less than 10% by weight and more preferably less than 5% by weight. Because of the increased dilution stability and performance characteristics, it is feasible to dilute the fine and micro emulsion to even significantly lower levels (e.g. less than 1%) and achieve the same or improved results.

The fine and micro emulsions useful in the instant invention are those which contain both a cationic and nonionic surfactant. It is preferred that the cationic surfactant be present at a level of at least 1.5% by weight based on the silicone content and more preferably of at least 5% by weight based on the silicone content. It is also preferred that the nonionic surfactant be present at a level of at least 5.0% by weight based on the silicone content and more preferably at a level of 15% by weight based on the silicone content.

Cationic surfactants which may be contained in the fine and micro emulsions can be selected from any cationic surfactant known in the art. The useful cationic surfactants can be exemplified by, but are not limited to, aliphatic fatty amines and their derivatives such as dodecylamine acetate, octadecylamine acetate and acetates of the amines of tallow fatty acids; homologues of aromatic amines having fatty chains such as dodecylanalin; fatty amides derived from aliphatic diamines such as undecylimidazoline; fatty amides derived from disubstituted amines such as oleylaminodiethyl- amine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta- hydroxyethylsterarylamide; amine salts of long chain fatty acids; quaternary ammonium bases derived from fatty amides of di-substituted diamines such as oleylbenzylaminoethylene diethylamine hydrochloride; quaternary ammonium bases of the benzimidazolines such as methylheptadecyl benzimidazol hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloromethyl ether; urethanes of ethylene diamine such as the condensation products of stearic acid and diethylene triamine; polyethylene diamines; and polypropanolpolyethanol amines. The preferred cationic surfactants are those that are of the quaternary ammonium type.

Cationic surfactants commercially available and useful in the instant invention include, but are not limited to ARQUAD T27W, ARQUAD 16-29, ARQUAD C-33, ARQUAD T50, ETHOQUAD T/13 ACETATE, all manufactured by AKZO CHEMIE.

Nonionic surfactants which may be contained in the fine and micro emulsions are selected from those known in the art as being nonionic surfactants. Preferred nonionic surfactants are those that have a hydrophilic-lipophilic balance (HLB) between 10 and 20 and are stable in the emulsion environment. The useful nonionic surfactants can be exemplified by but are not limited to, 2,6,8trimethyl-4-nonyloxypolyethylene oxyethanol (6EO) (sold as TERGITOL TMN-6 by UNION CARBIDE CORP.); 2,6,8-trimethyl-4-nonyloxypolyethylene oxyethanol (10EO) (sold as TERGITOL TMN-10 by UNION CARBIDE CORP.); alkyleneoxypolyethyleneoxyethanol (C 11-15, secondary alkyl, 7EO) (sold as TERGITOL 15-S-7 by UNION CARBIDE CORP.); alkyleneoxypolyethyleneoxyethanol (C 11-15, secondary alkyl, 9EO) (sold as TERGITOL 15-S-9 by UNION CARBIDE CORP.); alkyleneoxypolyethyleneoxyethanol (C 11-15, secondary alkyl, 15EO) (sold as TERGITOL 15-S-15 by UNION CARBIDE CORP.); octylphenoxy polyethoxy ethanol (40EO) (sold as TRITON X405 by ROHM and HAAS CO.), and nonylphenoxy polyethoxy ethanol (10EO) (sold as MAKON 10 by STEPAN CO.).

Additional surfactants that are useful in the instant invention are those that contain both the properties of the cationic surfactant and the nonionic surfactant. One such surfactant is ETHOQUAD 18/25 produced by AKZO CHEMIE.

Other components may also be present in the emulsion, these include preservatives, fungicides, corrosion inhibitors, antioxidants, the catalyst and neutralizer and/or compounds formed from the reaction between them, and others.

It has also been found that the antimarring properties can be further improved by using fine and micro emulsions with a higher silicone polymer viscosity. Preferred are fine and micro emulsions with a silicone polymer viscosity of at least 500 centipoises and more preferably 1000 centipoises. Because it is difficult to prepare higher viscosity fine and micro emulsions using mechanical emulsion techniques, it is preferred to produce the higher viscosity fine and micro emulsions using emulsion polymerization.

Fine and micro emulsions of particular usefulness as process aids in web printing are those described in U.S. patent application entitled "Rust Inhibiting Silicone Emulsions" by Gee, commonly owned, filed concurrently, hereby incorporated by reference. Fine and micro emulsion having the composition as taught in the U.S. patent application entitled "Rust Inhibiting Silicone Emulsions" are useful due to the rust or corrosion inhibiting properties which are inherent to the emulsion composition. The emulsions taught in U.S. patent application entitled "Rust Inhibiting Silicone Emulsions" comprise at least one cationic surfactant containing an anion which has a parent acid with a $pK_a$ of 3 or greater. The use of this surfactant provides the inherent rust inhibiting properties.

The web printing process had numerous metal or steel surfaces in which the emulsions contact. The inherent rust or corrosion resistant properties eliminates the need for additives to inhibit rust or corrosion.

The silicone fine and micro emulsions are used as process aids in the web printing process by applying them to the web of paper immediately or shortly after the paper leaves a drying oven wherein the ink is dried or cured. The silicone fine and micro emulsion is picked up from a bath onto a roller which comes into contact with the paper thereby applying the fine and micro emulsion to the paper. Upon application to the paper the silicone polymer provides a protective barrier over the ink to prevent marring or smearing.

So that those skilled in the art can understand and appreciate the invention taught herein, the following examples are presented, it being understood that these examples should not be used to limit the scope of this invention over the limitations found in the claims attached hereto.

EXAMPLE 1

A microemulsion was prepared using emulsion polymerization according the U.S. patent application Ser. No. 07/439,751 filed Nov. 21, 1989, by Tanaka et al. The pre-emulsion contained 60 parts cyclicsiloxanes having an average of 4 Si per molecule, 6 parts nonionic surfactant (MAKON 10), and 34 parts water. The microemulsion was prepared using 58.33 parts of the pre-emulsion, 21.4 parts of ARQUAD T27W (cationic surfactant), 6.02 parts of MAKON 10, 11.12 parts of water, 2 parts of 20% sodium hydroxide (catalyst), 1.10 parts 75% phosphoric acid (neutralizer), 0.03 parts Kathon GC/ICP (preservative) and 1.35 parts of a rust inhibitor. The resulting microemulsion had a particle size of 28 nanometers.

The microemulsion was diluted to 2.4 weight percent non volatile content. The microemulsion was applied to a 70 lb. paper following printing on a HARRIS M80 printing press. The press was operating at a rate of 600 ft./min. Static before application of the microemulsion was measured to be 600 volts. After application the static was measured to be 200 volts and at the folder the static was 100 volts. Roller wettability was determined to be fair to good.

EXAMPLE 2

The same microemulsion as prepared in Example 1 was diluted to 2.8 weight percent non volatile content. The microemulsion was applied to a 50 lb. paper following printing on a HARRIS M80 printing press. The press was operating at a rate of 733 ft./min. The applicator speed was 10/15 (top/bottom). Static before application of the microemulsion was measured to be 1,000 to 2,000 volts. After application the static was measured to be 200 volts and before and after the sheeter the static was 100 and 20 volts, respectively. Roller wettability was determined to be good.

COMPARATIVE EXAMPLE 2

The same press and paper were used as in example 2. An emulsion supplied by RYCOLINE PRODUCTS under the name Y820 was used. The emulsion was diluted to 3.4% non volatile content. The press was operating at a rate of 704 ft./min. The applicator speed was 15/20 (top/bottom). Static before application of the emulsion was measured to be 500 volts. After application the static was measured to be 300 volts and before and after the sheeter the static was 100 to 200 volts and 50 volts, respectively. Roller wettability was determined to be fair to good.

EXAMPLE 3

A microemulsion was prepared by the method taught in U.S. patent application entitled "Method for Making Polysiloxane Emulsions" by Gee, commonly owned, filed concurrently. The microemulsion was prepared by combining 46.17 parts water, 12 parts ETHOQUAD T13/ACETATE and 5.5 parts of TERGITOL 15S12. 35 parts of cyclicsiloxanes with an average of 4 Si atoms per molecule were added. The mixture was heated to 85° C. and 1 part of 20% Sodium Hydroxide was added to catalyze the polymerization reaction. The mixture was held at 85° C. for 5 hours with agitation. 0.3 parts of glacial acetic acid was added to neutralize the solution. When the emulsion solution had cooled, 0.02 parts of Kathon LX 1.5 (a preservative) was added.

The microemulsion was diluted to 1.46 weight percent non volatile content. The microemulsion was applied to a Carolina Gloss, coated, 38 lb. paper following printing on a M.A.N. ROLAND, 22¾×38 printing press. The press was operating at a rate of 1320 ft./min. Static before application of the microemulsion was measured to be 3000 volts. After application it was measured to be 0 to 600 volts. Roller wettability was determined to be very good.

COMPARATIVE EXAMPLE 3

The same press and paper were run as in Example 1 using a fine emulsion having a particle size of approximately 241 nm and comprised of 0.2 percent cationic surfactant, 6.5 percent nonionic surfactant and 55 percent silicone. The emulsion was diluted with water such that it contained 2.20% by weight non volatile content. The press was operating at a rate of 1320 ft./min. Static before application of the emulsion was measured to be 2000 to 4000 volts. After application it was measured to be 1000 to 1500 volts. Roller wettability was determined to be fair with some signs of pinholing.

EXAMPLE 4

The same microemulsion as prepared in Example 3 was diluted with water to 0.39 weight percent non volatile content. The microemulsion was applied to a NORTHCOTE RMP 50 lb. paper following printing on a HARRIS M1000B printing press. The press was operating at a rate of 1715 ft./min. Static after application of the microemulsion was measured to be 20 to 400 volts. Roller wettability was determined to be very good.

COMPARATIVE EXAMPLE 4A

The same press and paper were run as in Example 4 using a fine emulsion having a particle size of approximately 241 nm and comprised of 0.2 percent cationic surfactant, 6.5 percent nonionic surfactant and 55 percent silicone. The emulsion was diluted such that it contained 1.80% by weight non volatile content. The press was operating at a rate of 1670 ft./min. Static after application of the emulsion was measured to be 100 to 3000 volts. Roller wettability was determined to be fair with some signs of pinholing.

COMPARATIVE EXAMPLE 4B

The same press and paper were run as in Example 4 using a standard emulsion having a particle size of approximately 300 nm and comprised of 3 percent nonionic surfactant, 60 percent silicone and no cationic surfactant. The emulsion was diluted such that it contained 4.50% by weight non volatile content. The press was operating at a rate of 1500 ft./min. Static after application of the emulsion was measured to be 2000 to 8000 volts. Roller wettability was determined to be fair with some signs of pinholing.

EXAMPLE 5

Two different trials were conducted on two separate days to determine the lowest concentration that could be obtained before marring was visible. The first trial was done on the same paper and press as used in Example 4. The second trial was one on a coated 40 lb. paper and the same press as used in Example 4. Results showing the test conditions and dilutions are given in Table 1. These results illustrate the improved antimarring at higher silicone polymer viscosities.

Sample A is the same emulsion as used in Comparative Example 4B, Sample B is the same emulsion as used in Comparative Example 4A, Sample C is the same microemulsion as used in Example 4 and Sample D is a microemulsion prepared by the method taught in U.S. Patent Application entitled "Method for Making Polysiloxane Emulsions" by Gee, commonly owned, filed concurrently. The microemulsion (Sample D) was prepared by combining 45 parts water, 10.3 parts ETHOQUAD T13/ACETATE and 4.7 parts of TERGITOL 15S12. 30 parts of cyclicsiloxanes with an average of 4 Si atoms per molecule and 0.45 parts of methyltrimethoxysilane were added. The mixture was heated to 85° C. and 0.35 parts of 20% Sodium Hydroxide was added to catalyze the polymerization reaction. The mixture was held at 85° C. for 9 hours with agitation. 0.27 parts of glacial acetic acid was added to neutralize the solution. When the emulsion solution had cooled, 0.03 parts of Kathon LX 1.5 (a preservative) was added.

TABLE 1

| | | % Nonvolatiles in the Emulsion | | | |
|---|---|---|---|---|---|
| | | DAY 1 | | DAY 2 | |
| SAMPLE | VISC.* (cp) | No Marring | Marring | No Marring | Marring |
| A | 80 | 4.5 | 2.8 | 2.7 | 1.9 |
| B | 1000 | 1.8 | 1.2 | 1.9 | 1.5 |
| C | 3000 | 0.21 | ND | 0.72 | 0.54 |
| D | 9400 | 1.6 | 1.1 | 0.55 | 0.31 |

ND = No lower dilution was tested

*Viscosity is that of the silicone polymer measured by breaking the emulsion, recovering the silicone polymer and measuring the viscosity of the recovered silicone polymer.

What is claimed is:

1. An improved method of web printing wherein the method comprises
   A) applying ink to a paper surface
   B) drying the ink on the paper surface and
   C) coating the paper surface with an aqueous silicone polymer emulsion comprising
      i) a particle size of less than 200 nanometers,
      ii) at least 1.5 weight percent, based on the silicone content, of a cationic surfactant, and
      iii) at least 5 weight percent, based on the silicone content, of a nonionic surfactant.

2. A process as claimed in claim 1 wherein the emulsion is prepared using emulsion polymerization.

3. A process as claimed in claim 1 wherein the particle size is less than 140 nanometers.

4. A process as claimed in claim 1 wherein the polymer in the emulsion has a viscosity of at least 500 centipoises.

5. A process as claimed in claim 1 wherein the cationic surfactant is selected from tallow trimethyl quaternary ammonium compounds.

6. A process as claimed in claim 1 wherein the components used in producing the emulsion comprise at least one cationic surfactant containing an anion which has a parent acid with a $pK_a$ of 3 or greater.

* * * * *